United States Patent
Huang

(10) Patent No.: US 9,477,089 B2
(45) Date of Patent: Oct. 25, 2016

(54) ILLUMINATION SYSTEM, PROJECTION APPARATUS AND ILLUMINATION SWITCH METHOD

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 105 days.

(21) Appl. No.: 14/477,254

(22) Filed: Sep. 4, 2014

(65) Prior Publication Data

US 2015/0301345 A1 Oct. 22, 2015

(30) Foreign Application Priority Data

Apr. 16, 2014 (TW) .............................. 103113804 A

(51) Int. Cl.
| | |
|---|---|
| *G03B 21/20* | (2006.01) |
| *H04N 13/04* | (2006.01) |
| *G02B 27/22* | (2006.01) |
| *G02B 27/12* | (2006.01) |

(52) U.S. Cl.
CPC ......... *G02B 27/2242* (2013.01); *G02B 27/126* (2013.01); *G03B 21/204* (2013.01); *H04N 13/0452* (2013.01)

(58) Field of Classification Search
CPC .... G03B 21/204; G03B 21/20; G03B 35/22; G03B 35/16; H04N 9/3111; H04N 9/3164; H04N 9/31; H04N 13/0452; H04N 13/0459

USPC ........................................ 353/7, 81; 362/260
See application file for complete search history.

(56) References Cited

U.S. PATENT DOCUMENTS

| | | | | |
|---|---|---|---|---|
| 2007/0273835 | A1* | 11/2007 | Fan ........................ | G03B 21/00 353/7 |
| 2012/0218529 | A1* | 8/2012 | Huang ............... | G03B 21/2013 353/102 |
| 2013/0314670 | A1* | 11/2013 | Huang ................... | G02B 27/22 353/7 |
| 2014/0185014 | A1* | 7/2014 | Huang ............... | G02B 27/2207 353/7 |
| 2014/0293170 | A1* | 10/2014 | Huang ................... | G03B 21/28 349/15 |

* cited by examiner

*Primary Examiner* — William C Dowling
*Assistant Examiner* — Ryan Howard
(74) *Attorney, Agent, or Firm* — Muncy, Geissler, Olds & Lowe, P.C.

(57) ABSTRACT

An illumination system includes an optical switch component, a wavelength conversion element, a first light splitter and a light combining element. The optical switch component switches between a first state and a second state. The illumination system generates first and second waveband lights on the first and second states respectively. The first light splitter reflects a first light generated by a first light source to the wavelength conversion element to generate a second light. The composite light splitter includes a second light splitter to transmit a third light generated by a second light source to the optical switch component. In the first state, the optical switch component reflects the second light to the second light splitter to generate the first waveband light. On the second state, the second light and the third light penetrate the optical switch component to a reflection component to generate the second waveband light.

25 Claims, 11 Drawing Sheets

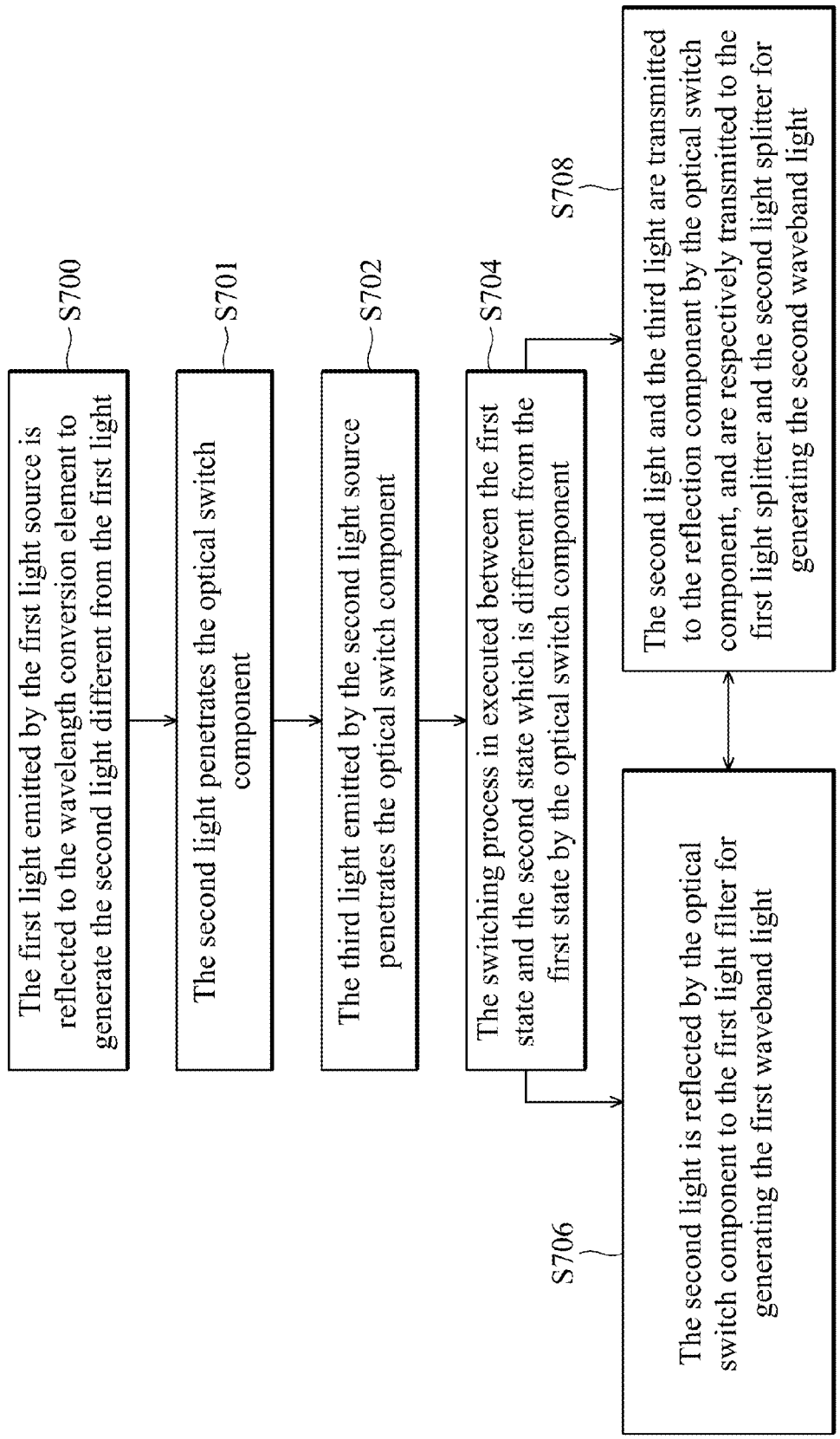

ILLUMINATION SYSTEM, PROJECTION APPARATUS AND ILLUMINATION SWITCH METHOD

CROSS REFERENCE TO RELATED APPLICATIONS

This Application claims priority of Taiwan Patent Application No. 103113804, filed on Apr. 16, 2014, the entirety of which is incorporated by reference herein.

BACKGROUND OF THE INVENTION

1. Field of the Invention

The present invention relates to an illumination system and illumination switch method, and in particular to the illumination system and the illumination switch method for projecting three-dimensional (3D) images.

2. Description of the Related Art

Since the manufacturing technology for a projection apparatus has gradually improved in recent years, there are more projection apparatuses capable of projecting 3D images. Wavelength multiplexing technology is a common 3D projection technology which multiplexes and switches the lasers of six different wavelengths (including two red lights, two blue lights and two green lights). However, the lasers for the green lights are low-power, low-efficiency and high-cost. Therefore, an easier, lighter and more efficient illumination system is needed for providing a light source of six different wavelengths to develop 3D images and meet market requirements.

BRIEF SUMMARY OF THE INVENTION

The present invention provides an illumination system including an optical switch component, a first light source, a first light splitter and a composite light splitter. The optical switch component is utilized to switch between a first state and a second state, which is different from the first state, wherein the illumination system generates a first waveband light in the first state and generates a second waveband light different from the first waveband light in the second state to support the projection of 3D images. The first light source is utilized to emit a first light. The first light splitter is utilized to reflect the first light to a wavelength conversion element to generate a second light different from the first light and transmit the second light to the optical switch component. The composite light splitter includes a second light splitter to transmit a third light emitted by a second light source to the optical switch component. In the first state, the optical switch component reflects the second light to a first light filter of the second light splitter to generate the first waveband light. In the second state, the second light and the third light penetrate the optical switch component to a reflection component respectively and penetrate the first light splitter and the second light splitter respectively for generating the second waveband light.

The present invention provides an illumination switch method which includes reflecting a first light emitted by a first light source to a wavelength conversion element to generate a second light different from the first light; penetrating a third light emitted by a second light source to an optical switch component; and switching between a first state and a second state different from the first state by the optical switch component, wherein in the first state the second light is reflected by the optical switch component to the first light filter for generating the first waveband light, and in the second state the second light and the third light penetrate the optical switch component to a reflection component respectively and penetrate the first light splitter and the second light splitter respectively for generating the second waveband light.

BRIEF DESCRIPTION OF THE DRAWINGS

The present invention can be more fully understood by reading the subsequent detailed description and examples with references made to the accompanying drawings, wherein:

FIG. 7 is a schematic diagram of the illumination switch method according to an embodiment of the invention.

DETAILED DESCRIPTION OF THE INVENTION

It should be understood that the following disclosure provides many different embodiments, or examples, for implementing different features of the disclosure. Specific examples of components and arrangements are described below to simplify the present disclosure. These are, of course, merely examples and are not intended to be limiting. Various features may be arbitrarily drawn in different scales for the sake of simplicity and clarity. Furthermore, the formation of a first feature over or on a second feature in the description may include embodiments in which the first and second features are formed in direct or indirect contact.

Figure 1:
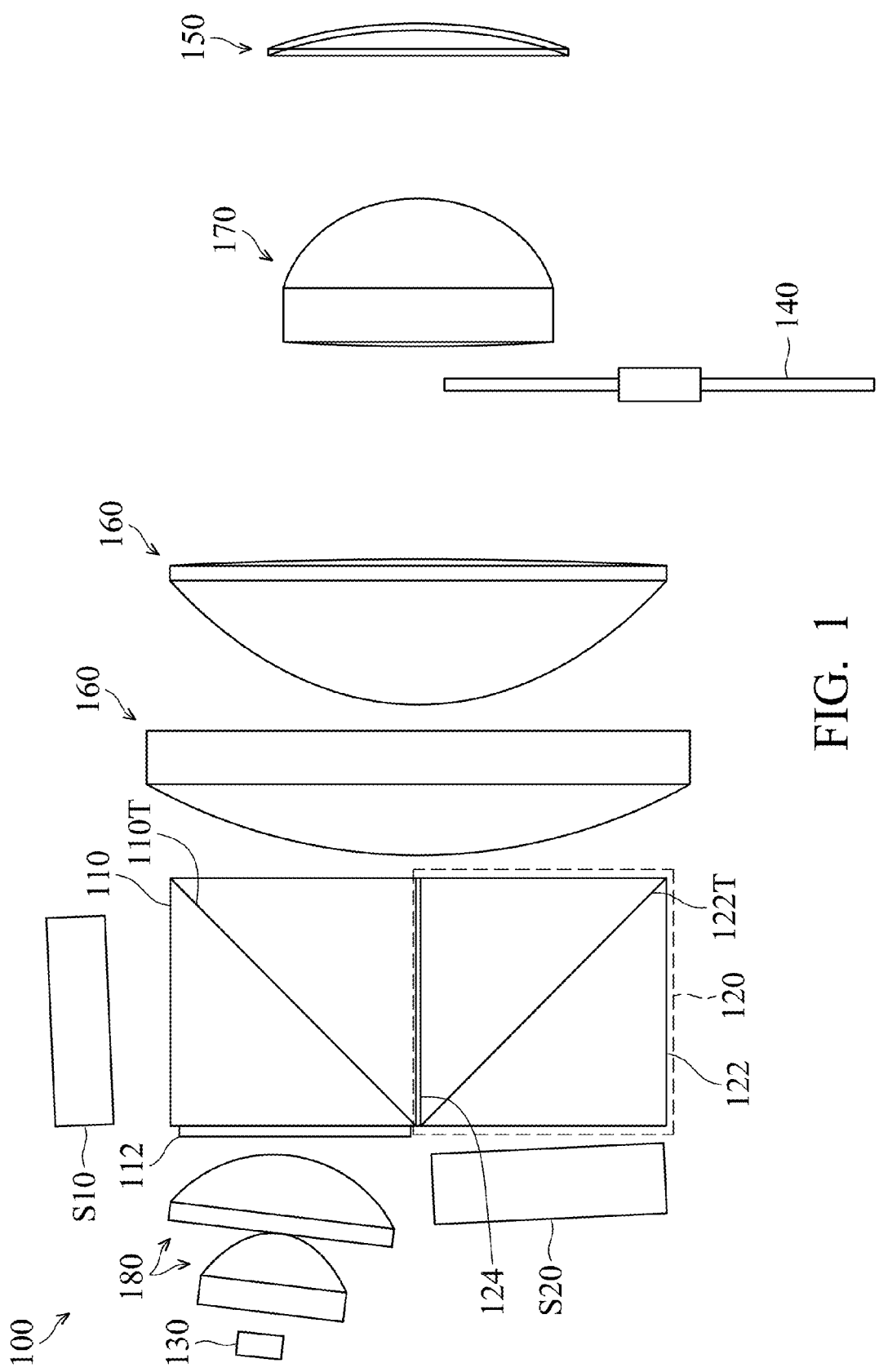
FIG. 1 is a schematic diagram of the illumination system according to an embodiment of the invention.

FIG. 1 is a schematic diagram of the illumination system 100 of the present invention. In one embodiment, the illumination system 10 includes the first light source S10, the second light source S20, the first light splitter 110, the composite light splitter 120, the wavelength conversion element 130, the optical switch component 140 and the reflection component 150. It should be noted that the composite light splitter 120 includes the second light splitter 122, and the second light splitter 122 includes the first light filter 124. As shown in FIG. 1, in this embodiment, the first light splitter 110 is adjacent to the second light splitter 122, and the first light filter 124 is arranged between the first light splitter 110 and the second light splitter 122.

In one embodiment, the first light splitter 110 and the second light splitter 122 are named the light splitter (not shown). In addition, the light splitter mentioned above is arranged between the wavelength conversion element 130 and the optical switch component 140, and the optical switch component 140 is arranged between the first light splitter 110, the second light splitter 122 and the reflection component 150. For example, the first light splitter 110 and the second light splitter 122 are prisms used for the total reflection. In other words, as shown in FIG. 1, the first light splitter 110 has a total-reflection surface 110T, and the second light splitter 122 has a total-reflection surface 122T. In another embodiment, at least one light condenser can be arranged on the illumination system 100 for condensing light and reducing the volume of the illumination system 100. For example, at least one first light condenser 160 is arranged between the light splitter and the optical switch component 140 for condensing the lights to the optical switch component 140. At least one second light condenser 170 is arranged between the optical switch component 140 and the reflection component 150 for condensing the lights to the reflection component 150. At least one third light condenser 180 is arranged between the wavelength conversion element 130 and the light splitter for condensing the lights to the wavelength conversion element 130. In this embodiment, the first light condenser 160, the second light condenser 170 and the third light condenser 180 are convex lenses. In other embodiments of the present invention, people skilled in the art can easily apply another number and pattern of light condensers and use light condensers of various types or materials.

Figure 2:
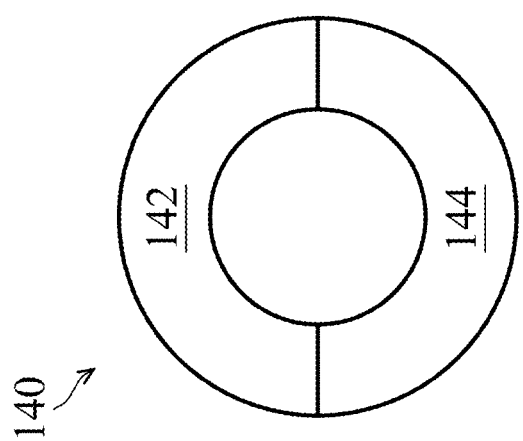
FIG. 2 is a schematic diagram of the optical switch component according to an embodiment of the invention.
Figure 4A:
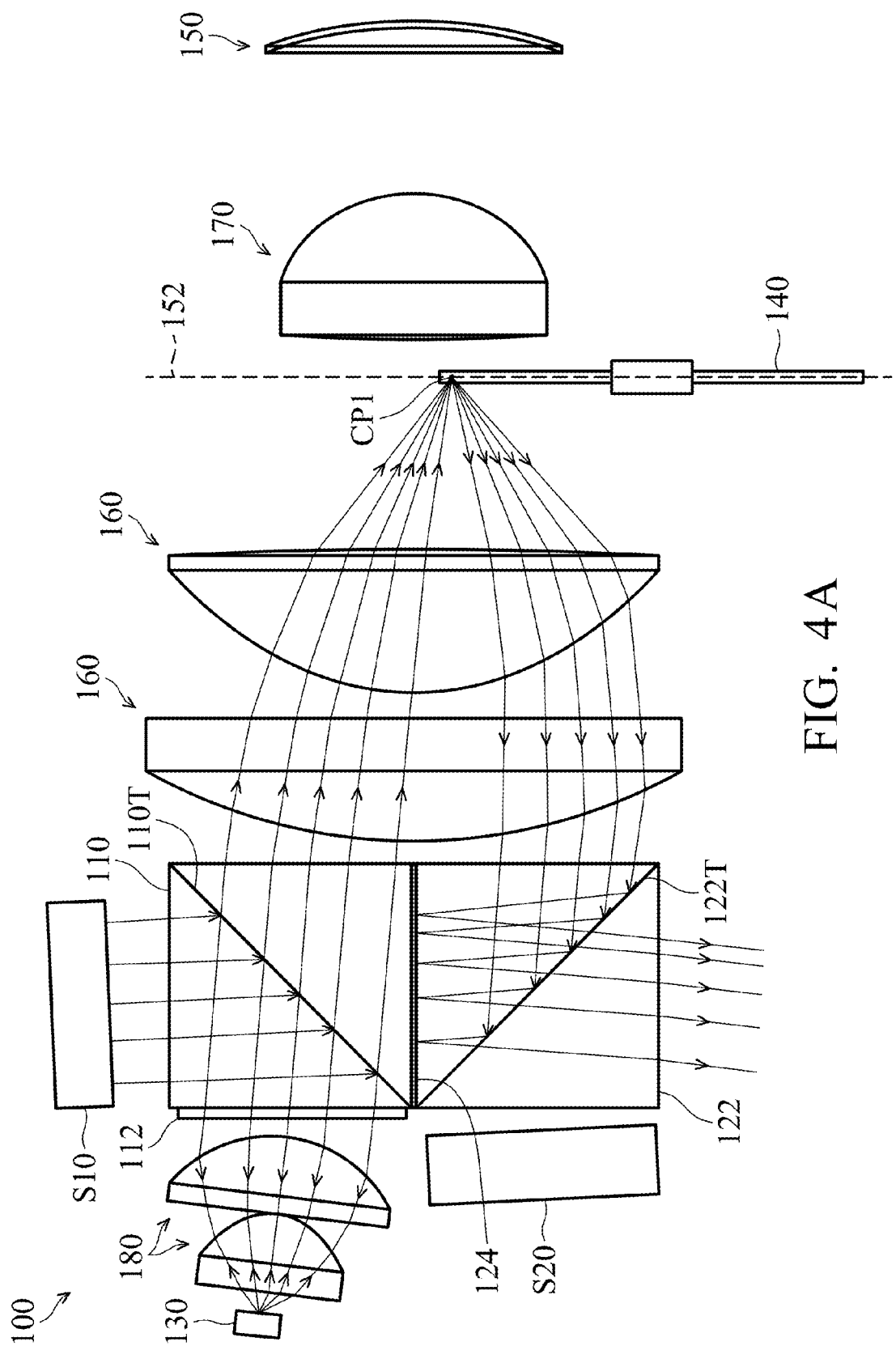
FIG. 4A is a schematic diagram of the illumination system which is switched to the first state according to an embodiment of the invention.

In one embodiment, the reflection component 150 is a spherical mirror to reflect light. It should be noted that the optical switch component 140 is arranged on the focal plane 152 of the reflection component 150 (as shown in FIG. 4A) so that the lights within the illumination system 100 can penetrate the two conjugate points on the focal plane 152. FIG. 2 is a schematic diagram of the optical switch component 140 according to an embodiment of the invention. For example, as shown in FIG. 2, the optical switch component 140 is a rotating disk, and the optical switch component 140 includes a reflection area 142 and a transmission area 144. The reflection area 142 can be a mirror to reflect the lights. The transmission area 144 is a transparent material or is hollowed out for transmitting the lights to the reflection component 150 or transmitting the lights from the reflection component 150. In addition, the first light source S10 and the second light source S20 can be lasers or light-emitting diodes (LEDs).

Figure 3:
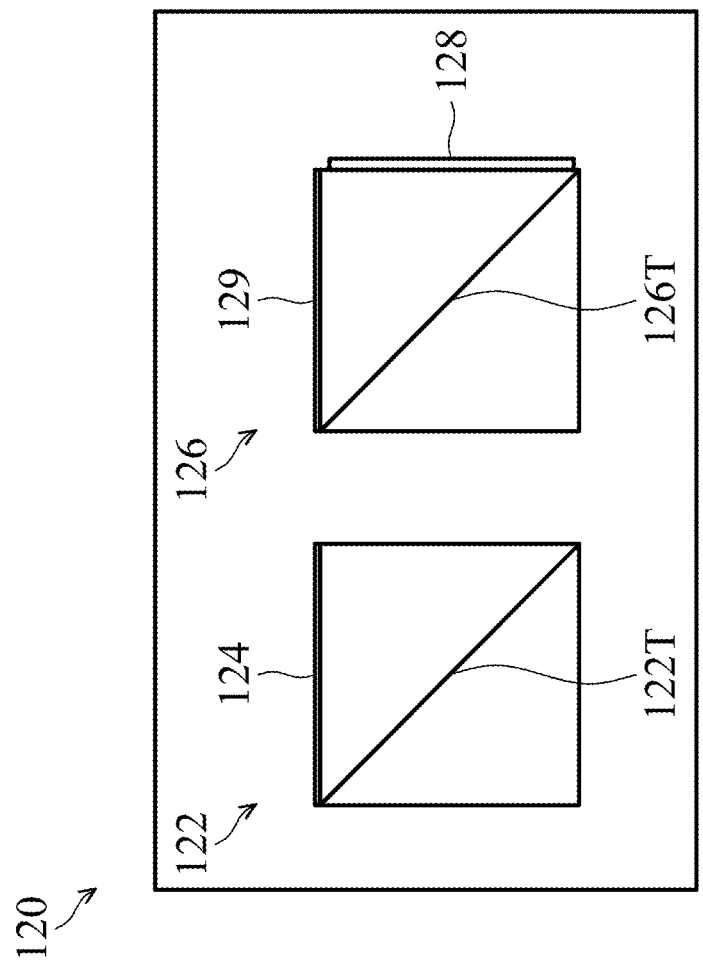
FIG. 3 is a schematic diagram of the composite light splitter according to an embodiment of the invention.

FIG. 3 is a schematic diagram of the composite light splitter 120 according to an embodiment of the invention. The composite light splitter 120 includes the second light splitter 122 and the third light splitter 126. For example, the second light splitter 122 and the third light splitter 126 are prisms used for the total reflection. As shown in FIG. 3, the second light splitter 122 includes the first light filter 124 and the total-reflection surface 122T, and the third light splitter 126 includes the mirror surface 129 and the second light filter 128. Specifically, the second light filter 128 is arranged on the side of the third light splitter 126 which is near the optical switch component 140, and the mirror surface 129 is arranged between the third light splitter 126 and the first light splitter 110. In one embodiment, the composite light splitter 120 is a structure with a changeable mechanism and accords with the illumination system 100 to utilize the second light splitter 122 or the third light splitter 126. In other words, when the illumination system 100 supports the projection of 3D images, and the second light splitter 122 is utilized in the illumination system 100 as shown in FIG. 1. When the illumination system 100 supports the projection of 2D images, the third light splitter 126 is utilized in the illumination system 100. The arrangement of the third light splitter 126 is shown in FIG. 6 and will be described in detail later. For example, when the illumination system is in the mode of 3D projection, the second light splitter 122 is transmitted to the pre-determined position which is adjacent to the first light splitter 110 by the mechanical component so that the first light filter 124 is arranged between the first light splitter 110 and the second light splitter 122. When the illumination system is in the mode of 2D projection, the third light splitter 126 is transmitted to the pre-determined position which is adjacent to the first light splitter 110 by the mechanical component so that the mirror surface 129 is arranged between the first light splitter 110 and the third light splitter 126.

FIG. 4A is a schematic diagram of the illumination system 100 which is switched to the first state according to an embodiment of the invention. In this embodiment, the first light source S10 emits the first light to the first light splitter 110. Afterwards, the first light splitter 110 reflects the first light to the wavelength conversion element 130 to generate the second light which is different from the first light. Specifically, when the first light penetrates the first light splitter 110 and reaches the total-reflection surface 110T of the first light splitter 110, the first light is reflected to the wavelength conversion element 130 by the first light splitter 110 because the incident angle of the first light and the total-reflection surface 110T is greater than the critical angle of the first light splitter 110.

It should be noted that the wavelength conversion element 130 includes yellow phosphor. The first light emitted by the first light source S10 includes the first blue light. For example, the wavelength of the first blue light is about 440 nm to 450 nm. In this embodiment, the second light transmitted by the wavelength conversion element 130 includes the first blue light which is not converted by the yellow phosphor and the yellow light which is converted by the yellow phosphor. Specifically, the second light actually includes the first blue light, the first green light, the second light and the first red light. The second green light is different from the first green light. For example, the wavelength of the first green light is about 510 nm to 520 nm, the wavelength of the second green light is about 550 nm to 560 nm, and the wavelength of the first red light is about 610 nm to 620 nm. It can be known that when the wavelength conversion element 130 is illuminated by the first light, it will generate the second light including the first green light and the second green light. Therefore, the illumination system 100 provided by the present invention can replace the low-power green-light laser of low power to reduce cost and obtain a high-power green-light laser.

Figure 4B:
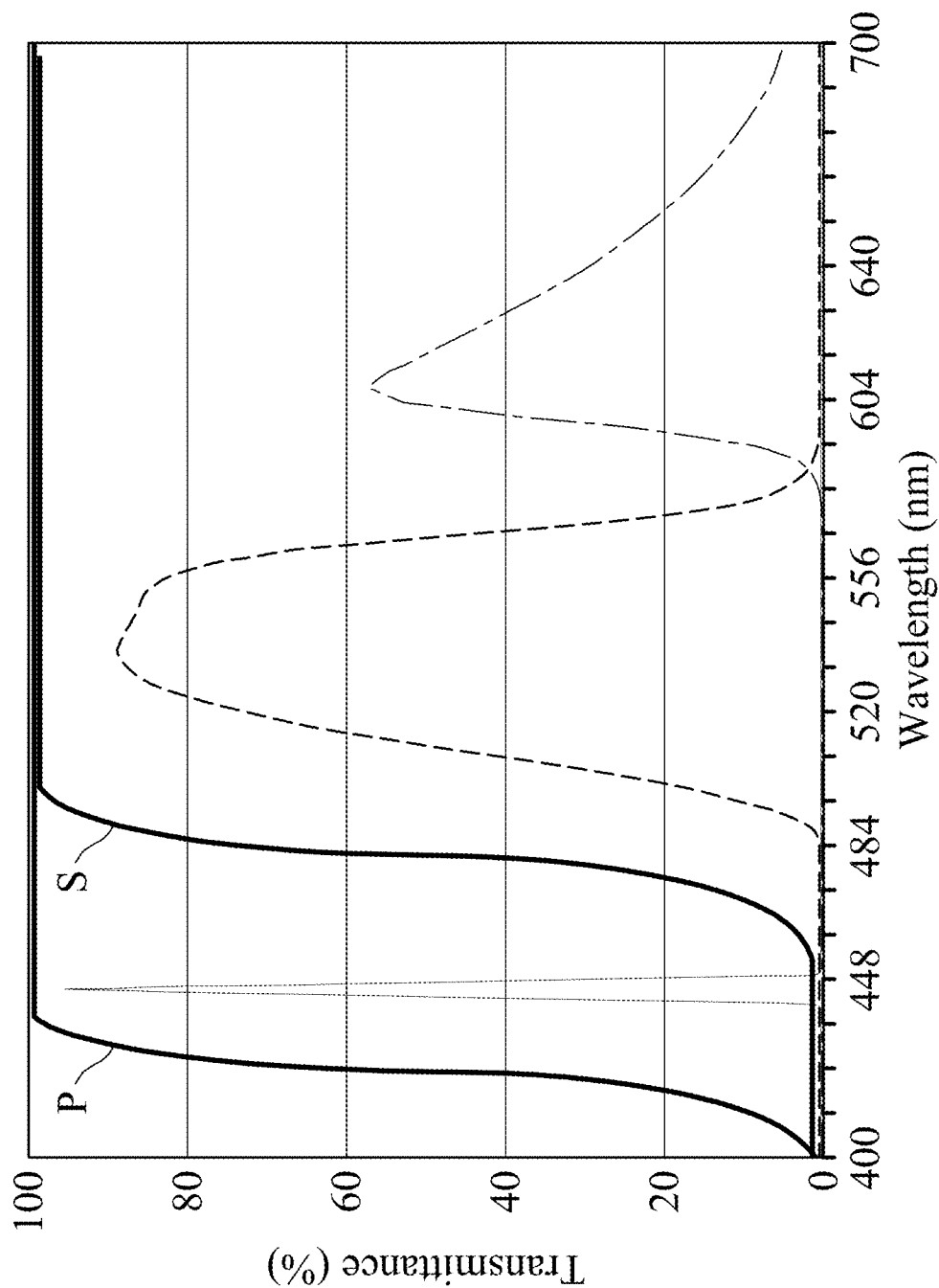
FIG. 4B is a schematic diagram of the transmittance of the first light splitter according to an embodiment of the invention.

As shown in FIG. 4A, the phase retarder 112 is arranged on the side of the first light splitter 110 which is near the wavelength conversion element 130. In one embodiment, the phase retarder 112 is a quarter wave plate. After the first light (including the first blue light) emitted by the first light source S10 is reflected by the first light splitter 110, it penetrates the phase retarder 112 and reaches the wavelength conversion element 130. Afterwards, the second light (including the first blue light) emitted by the wavelength conversion element 130 penetrates the phase retarder 112 again and reaches the first light splitter 110. It can be known that first blue light penetrates the phase retarder 112 twice. For example, as shown in FIG. 4B, when the first blue light of the first light is phase P, the first blue light of the second light will be phase S. Therefore, the first light splitter 110 can be the polarization beam splitter (PBS) of the blue light.

Afterwards, when the second light transmitted by the wavelength conversion element 130 reaches the first light splitter 110, it can penetrate the first light splitter 110 and reach the optical switch component 140 because the incident angle of the second light is smaller than the critical angle. It should be noted that the optical switch component 140 is utilized to switch between the first state and the second state which is different from the first state to support the projection of 3D images. In one embodiment, the illumination system 100 generates the first waveband light in the first state and the second waveband light different from the first waveband light in the second state. Specifically, the illumination system 100 is switched to the first state on the first period, switched to the second state on the second period, and switched to the first state again on the third period. By switching periodically between the first state and the second state, the illumination system 110 can generate the first waveband light and the second waveband light alternatively to the image-formation system and develop 3D images. In another embodiment, the optical switch component 140 is a rotating disk. The rotating speed of the rotating disk is determined by the speed of switching the first waveband light and the second waveband light by the illumination system 100.

Figure 4C:
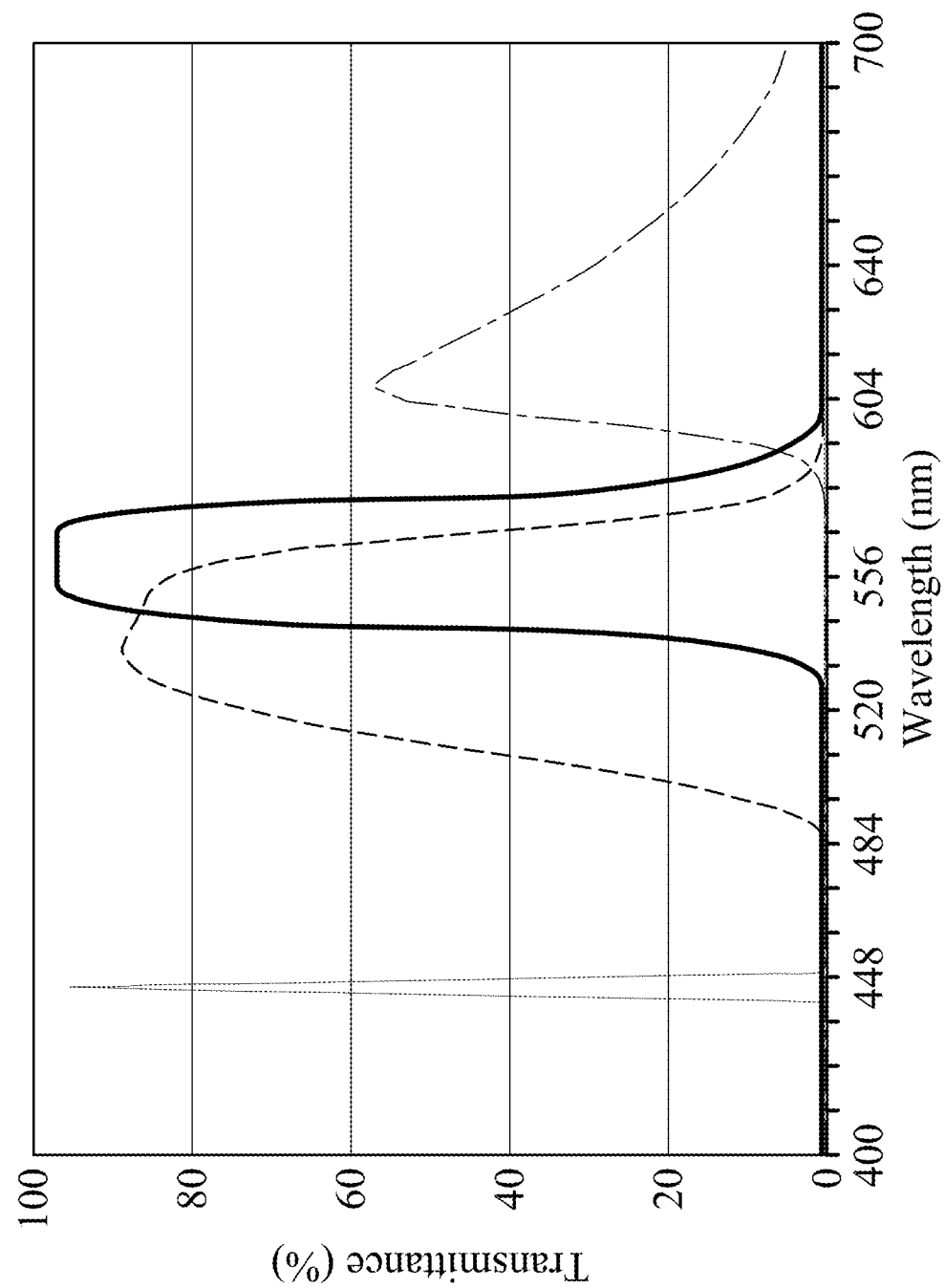
FIG. 4C is a schematic diagram of the transmittance of the first light filter according to an embodiment of the invention.

When the illumination system 100 is in the first state, the second light penetrates the first light splitter 110 and reaches the optical switch component 140. Specifically, in the first state, the optical switch component 140 rotates so that the conjugate focus CP1 is on the reflection area 142. The second light penetrates the first light splitter 110 and reaches the reflection area 142 of the optical switch component 140. In other words, in the first state, the optical switch component 140 reflects the second light so that the second light reaches the second light splitter 122. Specifically, as shown in FIG. 4A, the position where the optical switch component 140 reflects the second light is the conjugate focus CP1 of the reflection component 150. Afterwards, the second light is reflected to the first light filter 124 through the total reflection surface 122T of the second light splitter 122 for generating the first waveband light. As shown in FIG. 4C, the bold line represents the transmittance of the first light filter 124. It can be known that the first light filter 124 has the greatest transmittance at the wavelength range of about 550 nm to 560 nm. In other words, the first light filter 124 is utilized to penetrate the second green light and reflect lights other than the second green light. In this embodiment, the second light reflected by the second light splitter 122 to the first light filter 124 includes the first blue light, the first green light, the first red light and the second green light. Therefore, only the second green light penetrates the first light filter 124. The first blue light, the first green light and the first red light are all reflected by the first light filter 124 and become the first waveband light. In other words, in the first state, the first waveband light generated by the illumination system 100 includes the first blue light, the first green light and the first red light.

Figure 5A:
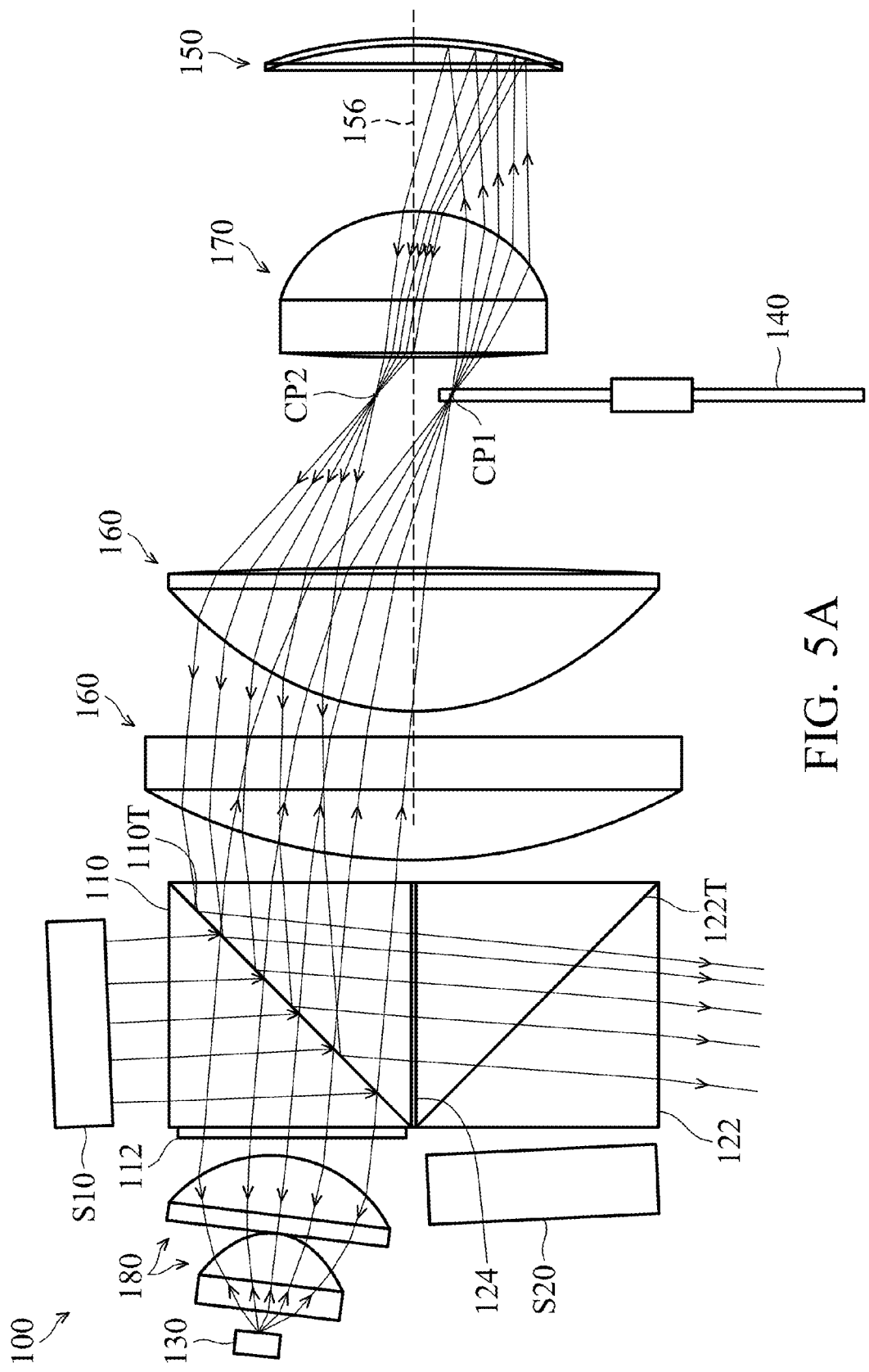
FIGS. 5A and 5B are schematic diagrams of the illumination system which is switched to the second state according to an embodiment of the invention.
Figure 5B:
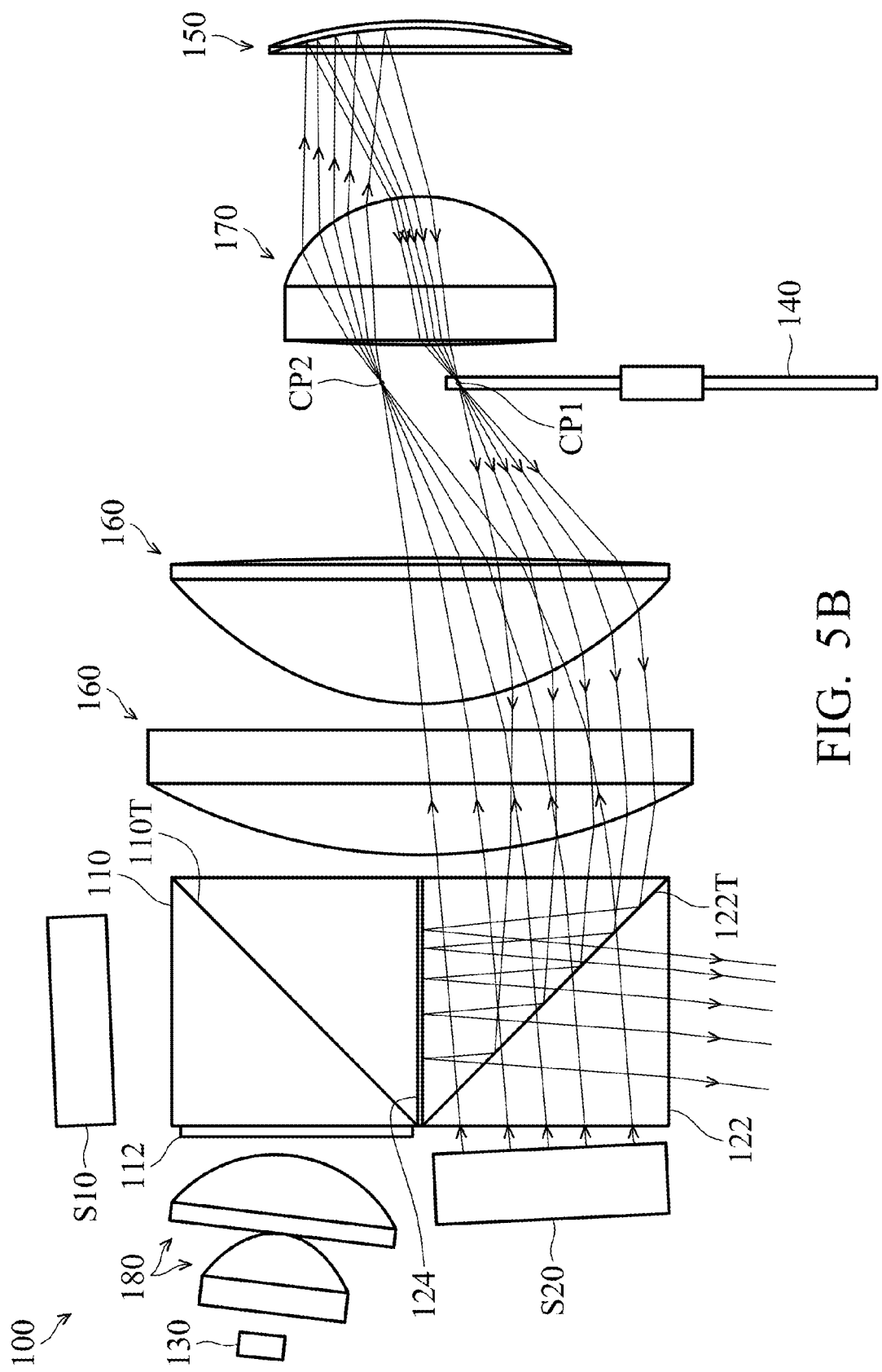

FIGS. 5A and 5B are schematic diagrams of the illumination system 100 which is switched to the second state according to an embodiment of the invention. The difference between the embodiment of FIG. 5A and the embodiment of FIG. 4A is that after the second light of the wavelength conversion element 130 penetrates the first light splitter 110, it reaches the transmission area 144 rather than the reflection area 142 of the optical switch component 140. Specifically, in the second state, the optical switch component 140 rotates so that the conjugate focus CP1 is on the transmission area 144. The second light penetrates the first light splitter 110 and reaches the transmission area 144 of the optical switch component 140. In other words, when the illumination system 100 is switched to the second state, the optical switch component 140 penetrates the second light to the reflection component 150. Specifically, the position where the optical switch component 140 penetrates the second light is the conjugate focus CP1 of the reflection component 150, which means that on the one hand, the second light focuses on the conjugate focus CP1. On the other hand, the second light reflected by the reflection component 150 also focuses on another conjugate focus CP2. As illustrated before, the conjugate focuses CP1 and CP2 are two conjugate points at the focal plane of the reflection component 150. It should be noted that the reflection component 150, the first light condenser 160 and the second light condenser 170 are arranged along the optical axis 156. The conjugate focuses CP1 and CP2 are symmetrical to the optical axis 156. Afterwards, the reflected second light reaches the first light splitter 110 and is reflected by the first light splitter 110 to the first light filter 124. Since the first light filter 124 is only utilized to penetrate the second green light, only the second green light of the second light can penetrate the first light filter 124 and become part of the second waveband light of the second state.

In another embodiment, as shown in FIG. 5B, the second light source S20 emits or transmits the third light, and the third light penetrates the second light splitter 122. Specifically, the third light includes the second red light and the second blue light which is different from the first blue light. In this embodiment, after the third light penetrates the second light splitter 122, it focuses on the conjugate focus CP2 and reaches the reflection component 150. It should be noted that third light reflected by the reflection component 150 focuses on the conjugate focus CP1, penetrates the transmission area 144 of the optical switch component 140 and reaches the second light splitter 122 again. In the meantime, the second light splitter 122 reflects the third light to the first light filter 124. Since the first light filter 124 is utilized to penetrate the second green light, the second red light and the second blue light of the third light are both reflected by the first light filter 124 and become parts of the second waveband light in the second state. It can be known that the second waveband light includes the second red light, the second blue light and the second green light.

Figure 6A:
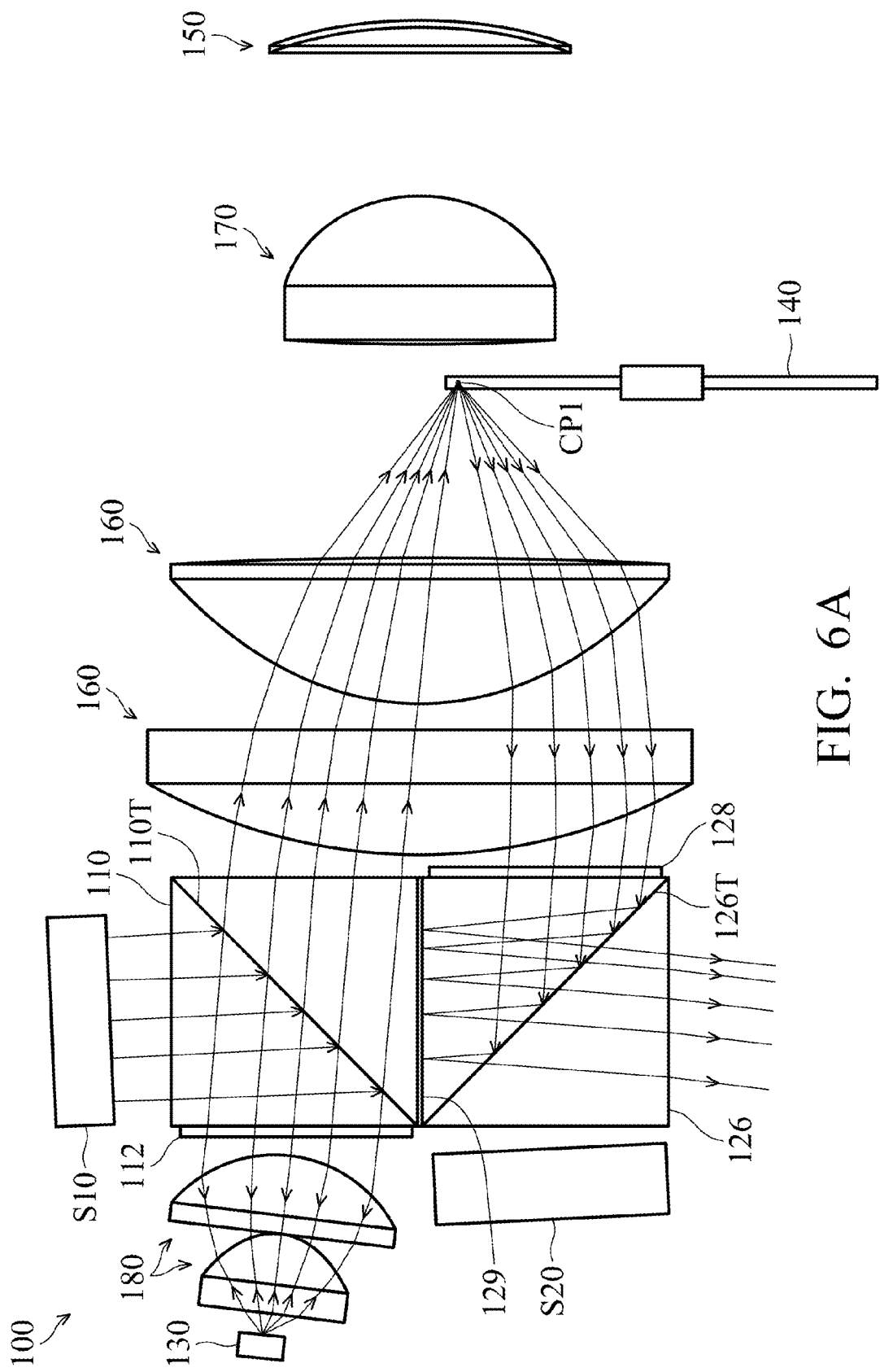
FIG. 6A is a schematic diagram of the illumination system which is switched to the 2D mode according to an embodiment of the invention.
Figure 6B:
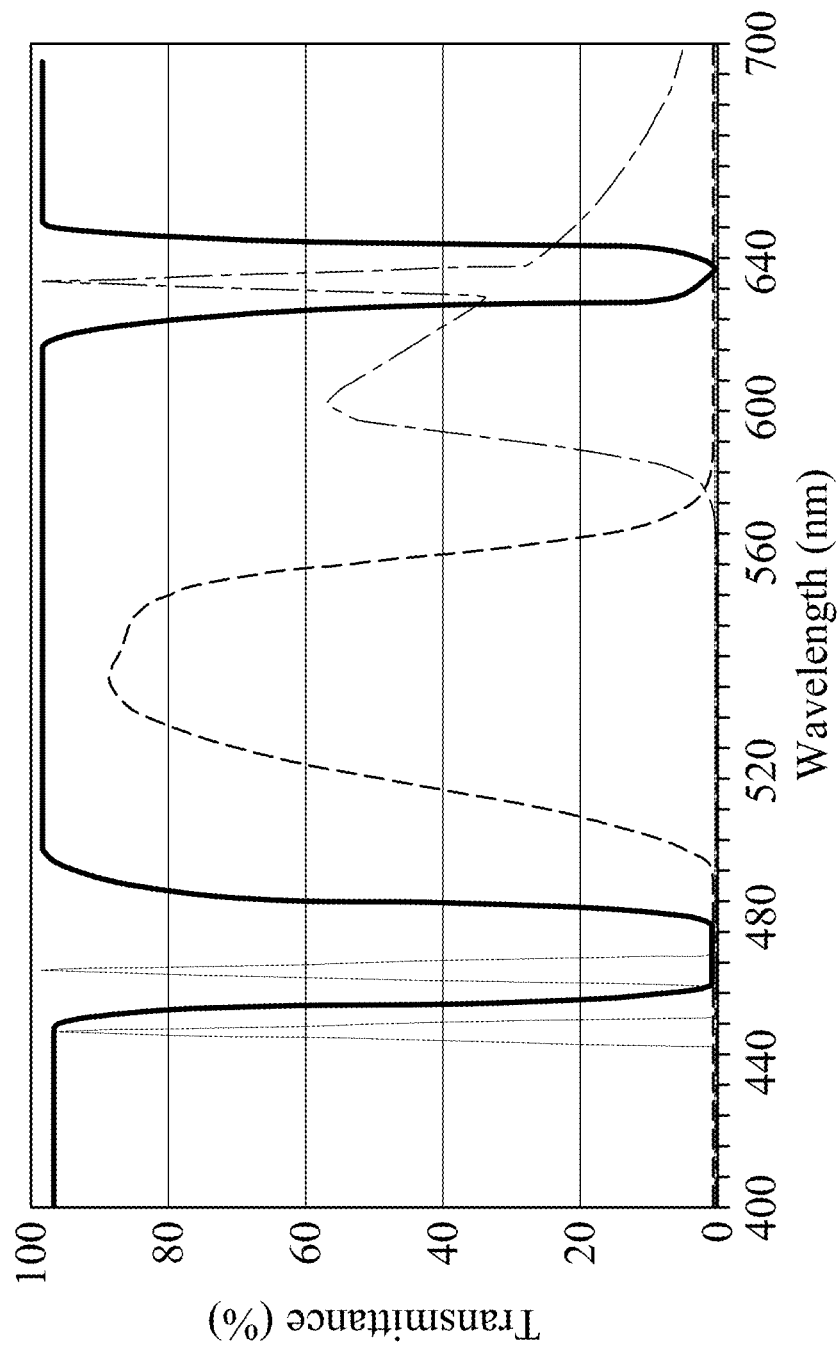
FIG. 6B is a schematic diagram of the transmittance of the second light filter according to an embodiment of the invention.

FIG. 6A is a schematic diagram of the illumination system 100 which is switched to the 2D mode according to an embodiment of the invention. The difference between the embodiment of FIG. 6A and the embodiment of FIG. 1 is that the illumination system 100 utilizes the third light splitter 126 rather than the second light splitter 122. In one embodiment, the second light filter 128 is arranged on the side of the third light splitter 126 near the optical switch component 140. The mirror surface 129 is arranged between the third light splitter 126 and the first light splitter 110. In addition, the second light filter 128 is utilized to reflect the second blue light and the second red light emitted by the second light source S20. FIG. 6B is a schematic diagram of the transmittance of the second light filter 128 according to an embodiment of the invention. It can be known that the second blue light of the wavelength of about 460 nm to 47 nm and the second red light of the wavelength of about 635 nm to 645 nm have the lowest transmittance. In other words, the second blue light and the second red light cannot penetrate or pass through the second light filter 128.

As shown in FIG. 6A, the first light emitted by the first light source S10 is reflected by the first light splitter 110 to the wavelength conversion element 130 for generating the second light, and the second light penetrates the first light splitter 110 and is reflected by the optical switch component 140 to reach the second light filter 128. The second light includes the first blue light, the first green light, the first red light and the second green light, and it does not include the second red light and the second blue light. Therefore, the second light can thoroughly penetrate the second light filter 128 and reach the third light splitter 126. Afterwards, the second light is reflected by the third light splitter 126 to the mirror surface 129, and is reflected by the mirror surface 129 to become the output light source of the illumination system 100. Therefore, when the illumination system 100 is switched to the 2D mode, it will output the first blue light, the first green light, the second green light and the first red light generated by the first light source S10 and the wavelength conversion element 130.

Figure 6C:
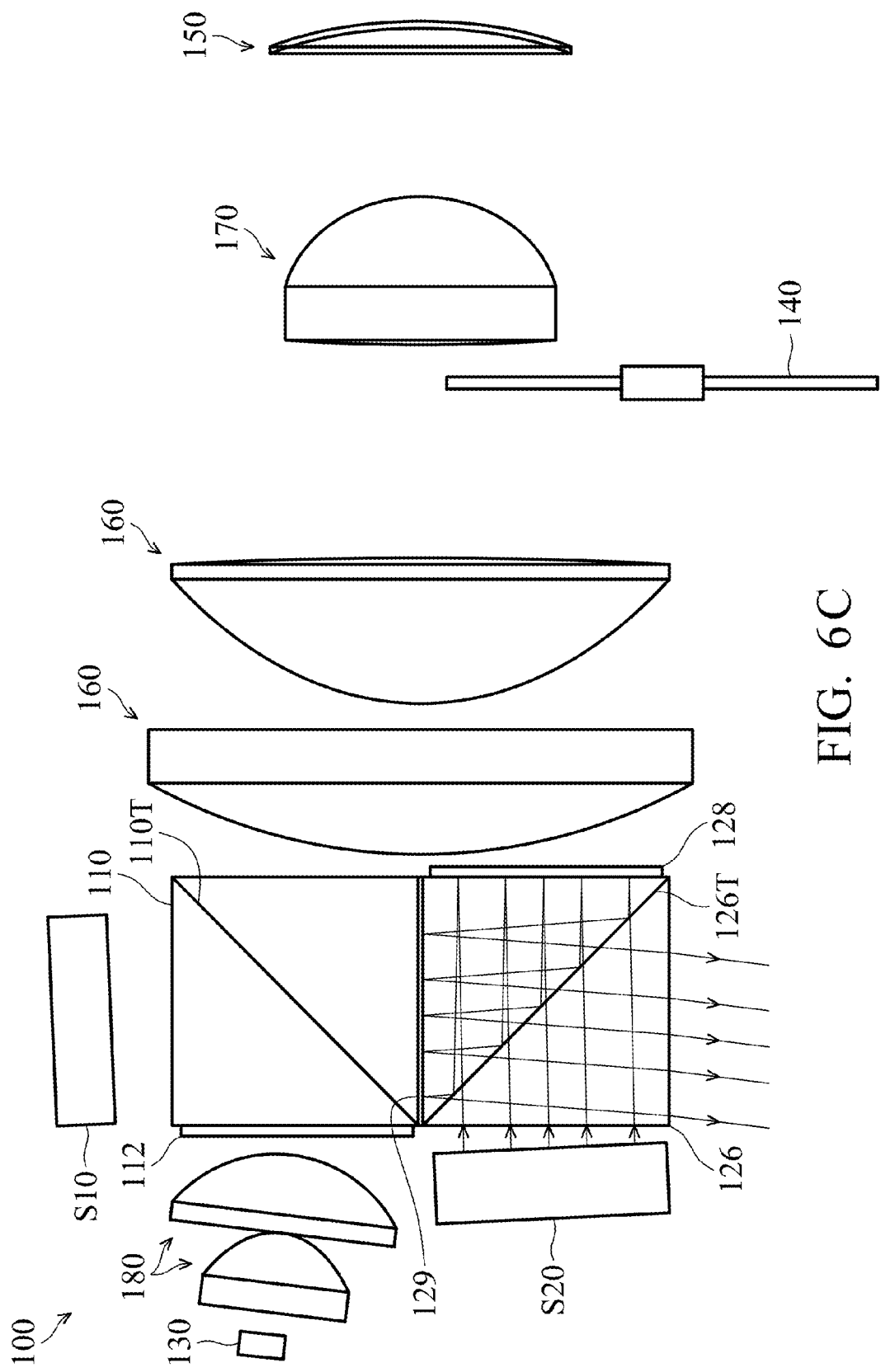
FIG. 6C is another schematic diagram of the illumination system which is switched to the 2D mode according to an embodiment of the invention.

FIG. 6C is another schematic diagram of the illumination system 100 which is switched to the 2D mode according to an embodiment of the invention. In this embodiment, the third light emitted by the second light source S20 penetrates the third light splitter 126 and reaches the second light filter 128. Since the third light includes the second red light and the second blue light, it will be reflected by the second light filter 128 and cannot pass thought it. Afterwards, the third light reflected by the second light filter 128 is reflected by the third light splitter 126 to the mirror surface 129, and is reflected by the mirror surface 129 to become the output light source of the illumination system 100. Therefore, when the illumination system 100 is switched to the 2D mode, it also outputs the second red light and the second blue light generated by the second light source S20. To sum up, since the first light source S10 and the second light source S20 operates at the same time when the illumination system 100 is switched to the 2D mode, the illumination system 100 generates the first blue light, the second blue light, the first green light, the second green light, the first red light and the second red light. In other words, the illumination system 100 outputs the first waveband light and the second waveband light at the same time, and switching is not needed to output the first waveband light and the second waveband light alternatively.

In addition, the present invention further provides a projection apparatus including the illumination system 100 and the image-formation system. The illumination system 100 is utilized to output the first waveband light and the second waveband light. The detailed configuration of the illumination system 100 and the switching method of the light source are illustrated above and will not be repeated again. In addition, the image-formation system is utilized to receive and operate the first waveband light and the second waveband light to form the 2D images or the 3D images. In another embodiment, the image-formation system includes a 3-chip projector. The projection apparatus can be an apparatus capable of projecting and displaying images, such as the projection display of digital light processing (DLP) or the projection display of a liquid-crystal display (LCD).

FIG. 7 is a schematic diagram of the illumination switch method according to an embodiment of the invention. First, in step S700, the first light emitted by the first light source S10 is reflected to the wavelength conversion element 130 to generate the second light different from the first light. In step S701, the second light penetrates the optical switch component 140. Afterwards, in step S702, the third light emitted by the second light source S20 penetrates the optical switch component 140. Afterwards, in step S704, the switching process in executed between the first state and the second state which is different from the first state by the optical switch component 140. When the illumination system 100 is in the first state, then step S706 is executed and the second light is reflected by the optical switch component 140 to the first light filter 124 for generating the first waveband light. When the illumination system 100 is in the second state, then step S708 is executed and the second light and the third light are transmitted to the reflection component 150 by the optical switch component 140, and are respectively transmitted to the first light splitter 110 and the second light splitter 122 for generating the second waveband light. The detail configuration of the illumination system 100 and the switch method of the light source are illustrated before and will not be repeated again.

Therefore, the illumination system 100 of the present invention can switch the lights from the first light source S10 and the second light source S20 by the optical switch component 140 with the usage of the smallest volume, and it can generate the first waveband light and the second waveband light respectively to support the projection of 3D images. In addition, the illumination system 100 of the present invention generates green lights by illuminating the wavelength conversion element 130 with the first light source S10 which includes the blue lights, and such green lights can replace the conventional green light source to improve the intensity of the green light and solve the problem of low illumination efficiency of conventional illumination systems. The illumination system 100 of the present invention can greatly solve the problems of conventional projection apparatuses.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An illumination system, comprising:
an optical switch component, utilized to switch between a first state and a second state different from the first state, wherein the illumination system generates a first waveband light in the first state and generates a second waveband light different from the first waveband light in the second state to support projection of 3D images;
a first light source, utilized to emit a first light;
a first light splitter, utilized to reflect the first light to wavelength conversion element to generate a second light different from the first light and transmit the second light to the optical switch component; and
a composite light splitter, comprising a second light splitter to transmit a third light emitted by a second light source to the optical switch component, wherein in the first state the optical switch component reflects the second light to a first light filter of the second light splitter for generating the first waveband light, and in the second state the second light and the third light penetrate the optical switch component to a reflection component respectively and penetrate the first light splitter and the second light splitter respectively for generating the second waveband light.

2. The illumination system as claimed in claim 1, wherein in the second state, after the second light and the third light penetrate the first light splitter and the second light splitter respectively, the first light splitter reflects the second light to the first light filter and the second light splitter reflects the third light to the first light filter for generating the second waveband light.

3. The illumination system as claimed in claim 1, wherein the optical switch component is arranged on a focal plane of the reflection component, and the second light and the third light penetrate two conjugate focuses on the focal plane.

4. The illumination system as claimed in claim 3, wherein the optical switch component is a rotating disk including a reflection area and a transmission area, and the reflection area is utilized to reflect the second light in the first state, and the transmission area is utilized to transmit the second light and the third light in the second state.

5. The illumination system as claimed in claim 3, wherein the reflection component is a spherical mirror.

6. The illumination system as claimed in claim 1, wherein the first light splitter is adjacent to the second light splitter, and the first light filter is arranged between the first light splitter and the second light splitter.

7. The illumination system as claimed in claim 1, further comprising at least one first light condenser arranged between the first light splitter, the second light splitter and the optical switch component to condense the second light or the third light to the optical switch component.

8. The illumination system as claimed in claim 1, further comprising at least one second light condenser arranged between the optical switch component and the reflection component to condense the second light or the third light to the reflection component.

9. The illumination system as claimed in claim 1, further comprising a phase retarder arranged on a side of the first light splitter near the wavelength conversion element to adjust a phase of a first blue light.

10. The illumination system as claimed in claim 1, wherein the wavelength conversion element comprises a yellow phosphor.

11. The illumination system as claimed in claim 10, wherein the first light emitted by the first light source comprises a first blue light, and the third light emitted by the second light source comprises a second red light and a second blue light which is different from the first blue light.

12. The illumination system as claimed in claim 10, wherein the second light transmitted by the wavelength conversion element comprises the first blue light, a first green light, a first red light and a second green light which is different from the first green light.

13. The illumination system as claimed in claim 12, wherein the first light filter is utilized to transmit the second green light.

14. The illumination system as claimed in claim 12, wherein the first waveband light comprises the first red light, the first blue light and the first green light, and the second waveband light comprises the second red light, the second blue light and the second green light.

15. The illumination system as claimed in claim 1, wherein the first light splitter and the second light splitter are total-reflection prisms.

16. The illumination system as claimed in claim 11, wherein the composite light splitter further comprises a third light splitter to support projection of 2D images in a third state.

17. The illumination system as claimed in claim 16, wherein in the third state, the third light splitter further comprises a second light filter which is arranged on a side of the third light splitter near the optical switch component and a mirror surface which is arranged between the third light splitter and the first light splitter.

18. The illumination system as claimed in claim 17, wherein the second light filter is utilized to reflect the second blue light and the second red light emitted by the second light source.

19. A projection apparatus, comprising:
the illumination system as claimed in claim 1, utilized to output the first waveband light or the second waveband light selectively; and
an image-formation system, utilized to receive and operate the first waveband light or the second waveband light to form an image.

20. The projection apparatus as claimed in claim 19, wherein the image-formation system comprises a projection system of 3-chip projector.

21. An illumination switch method, comprising:
reflecting a first light emitted by a first light source to wavelength conversion element to generate a second light different from the first light;
penetrating a third light emitted by a second light source to an optical switch component; and
switching between a first state and a second state different from the first state by the optical switch component, wherein in the first state the second light is reflected by the optical switch component to first light filter for generating the first waveband light, and in the second state the second light and the third light penetrate the optical switch component to a reflection component respectively and penetrate first light splitter and second light splitter respectively for generating the second waveband light.

22. The illumination switch method as claimed in claim 21, wherein in the second state, after the second light and the third light penetrate the first light splitter and the second light splitter respectively, the first light splitter reflects the second light to the first light filter and the second light splitter reflects the third light to the first light filter for generating the second waveband light.

23. The illumination switch method as claimed in claim 21, wherein the second light and the third light penetrate two conjugate focuses on a focal plane.

24. The illumination switch method as claimed in claim 23, wherein the second light is reflected by a reflection area of the optical switch component, and the second light and the third light are transmitted by a transmission area of the optical switch component.

25. The illumination switch method as claimed in claim 21, wherein the wavelength conversion element comprises the yellow phosphor, the first light emitted by the first light source comprises a first blue light, and the third light emitted by the second light source comprises a second red light and a second blue light which is different from the first blue light.

* * * * *